United States Patent
Eitreim et al.

(10) Patent No.: US 9,773,266 B2
(45) Date of Patent: Sep. 26, 2017

(54) METHOD AND SYSTEM FOR QUALITY AWARE DISCOVERY SUPPRESSION

(71) Applicant: Amazon Technologies, Inc., Seattle, WA (US)

(72) Inventors: Martin C. Eitreim, Seattle, WA (US); Sachin B. Singh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/872,891

(22) Filed: Oct. 1, 2015

(65) Prior Publication Data

US 2016/0019612 A1  Jan. 21, 2016

Related U.S. Application Data

(63) Continuation of application No. 13/540,135, filed on Jul. 2, 2012, now Pat. No. 9,152,724.

(51) Int. Cl.
*G06Q 30/00* (2012.01)
*G06Q 30/06* (2012.01)
*G06F 17/30* (2006.01)

(52) U.S. Cl.
CPC ... *G06Q 30/0603* (2013.01); *G06F 17/30867* (2013.01); *G06Q 30/0623* (2013.01)

(58) Field of Classification Search
CPC .......... G06F 17/30867; G06Q 30/0603; G06Q 30/0623
USPC .............................. 705/754, 26.1, 26.7, 27.2
See application file for complete search history.

(56) References Cited

U.S. PATENT DOCUMENTS

| | | | | |
|---|---|---|---|---|
| 5,950,218 A | * | 9/1999 | Howard ................ | G06F 3/0613 |
| | | | | 707/999.202 |
| 6,487,553 B1 | * | 11/2002 | Emens .............. | G06F 17/30864 |
| 6,721,721 B1 | * | 4/2004 | Bates .................... | G06F 21/562 |
| 7,263,515 B1 | * | 8/2007 | Tenorio .................. | G06Q 30/02 |
| 7,596,558 B2 | * | 9/2009 | Brewer ............. | G06F 17/30864 |
| 8,527,475 B1 | * | 9/2013 | Rammohan ....... | G06F 17/30489 |
| | | | | 707/692 |
| 2001/0044758 A1 | * | 11/2001 | Talib ................. | G06F 17/30622 |
| | | | | 705/26.1 |
| 2003/0172067 A1 | * | 9/2003 | Adar ....................... | G06Q 30/02 |
| 2005/0187854 A1 | * | 8/2005 | Cutler .................... | G06Q 40/00 |
| | | | | 705/37 |
| 2006/0080274 A1 | * | 4/2006 | Mourad ................. | G06Q 30/02 |
| 2006/0195428 A1 | * | 8/2006 | Peckover ............ | G06F 17/3064 |
| 2006/0218156 A1 | * | 9/2006 | Schechinger ..... | G06F 17/30864 |

(Continued)

OTHER PUBLICATIONS

Jiang, Zhihua, et al. "Retriever: Improving web search engine results using clustering." Technical report, University of Maryland Baltimore County (2000).*

(Continued)

*Primary Examiner* — Matthew Zimmerman
(74) *Attorney, Agent, or Firm* — Thomas | Horstemeyer, LLP

(57) ABSTRACT

Disclosed are various embodiments for a search result suppression application. A search result suppression application selects items from an electronic catalog. Suppression rules are selected and applied to the selected items. Items which meet conditions defined in the suppression rules are excluded from search results responsive to search queries subsequently applied to the electronic catalog.

20 Claims, 5 Drawing Sheets

(56) References Cited

U.S. PATENT DOCUMENTS

| | | | |
|---|---|---|---|
| 2007/0112729 A1* | 5/2007 | Wiseman | G06F 17/3087 |
| 2009/0089179 A1* | 4/2009 | Ho | G06Q 10/00 |
| | | | 705/26.1 |
| 2009/0171813 A1* | 7/2009 | Byrne | G06F 17/30867 |
| | | | 705/26.1 |
| 2009/0287532 A1* | 11/2009 | Cohen | G06Q 10/06 |
| | | | 705/7.14 |
| 2010/0023425 A1* | 1/2010 | Price | G06F 17/3087 |
| | | | 705/26.1 |
| 2012/0078731 A1* | 3/2012 | Linevsky | G06Q 30/0277 |
| | | | 705/14.73 |

OTHER PUBLICATIONS

Aug. 2005—X-Cart Manual.

\* cited by examiner

METHOD AND SYSTEM FOR QUALITY AWARE DISCOVERY SUPPRESSION

CROSS-REFERENCE TO RELATED APPLICATIONS

This application is a Continuation of and claims priority to U.S. application Ser. No. 13/540,135 titled "Quality Aware Discovery Suppression", filed Jul. 2, 2012, which is incorporated herein by reference in its entirety.

BACKGROUND

Search engines allow users to discover items in an electronic catalog. Problems arise when catalog entries returned in search results lack important information.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

Disclosed are various embodiments of a quality aware discovery suppression application. Search engines are used in electronic commerce systems to facilitate the discovery of products within an electronic catalog. Catalog entries within the electronic commerce system store information relating to a product to inform potential customers. In some instances, a catalog entry may be missing information important to the potential customer. This may decrease the likelihood of the customer initiating a purchase, or increase the likelihood the customer will be dissatisfied with the product if purchased. As a non-limiting example, a catalog entry for a diamond engagement ring may be missing information on the weight or quality of the jewel. As another non-limiting example, a catalog entry for a blue shirt may be missing a picture. By enforcing rules related to the catalog entries the appearance of such items in search results may be suppressed to increase the likelihood the customer will make an informed and satisfactory purchase.

By suppressing items missing important information or likely to result in an unsatisfied customer, items which are more likely to be purchased receive a greater visibility in search results. This results in increased revenue opportunities for the merchant, as well as an improved perception of the merchant by the customer by only presenting the most relevant and satisfactory items.

In the following discussion, a general description of the system and its components is provided, followed by a discussion of the operation of the same.

Figure 1:
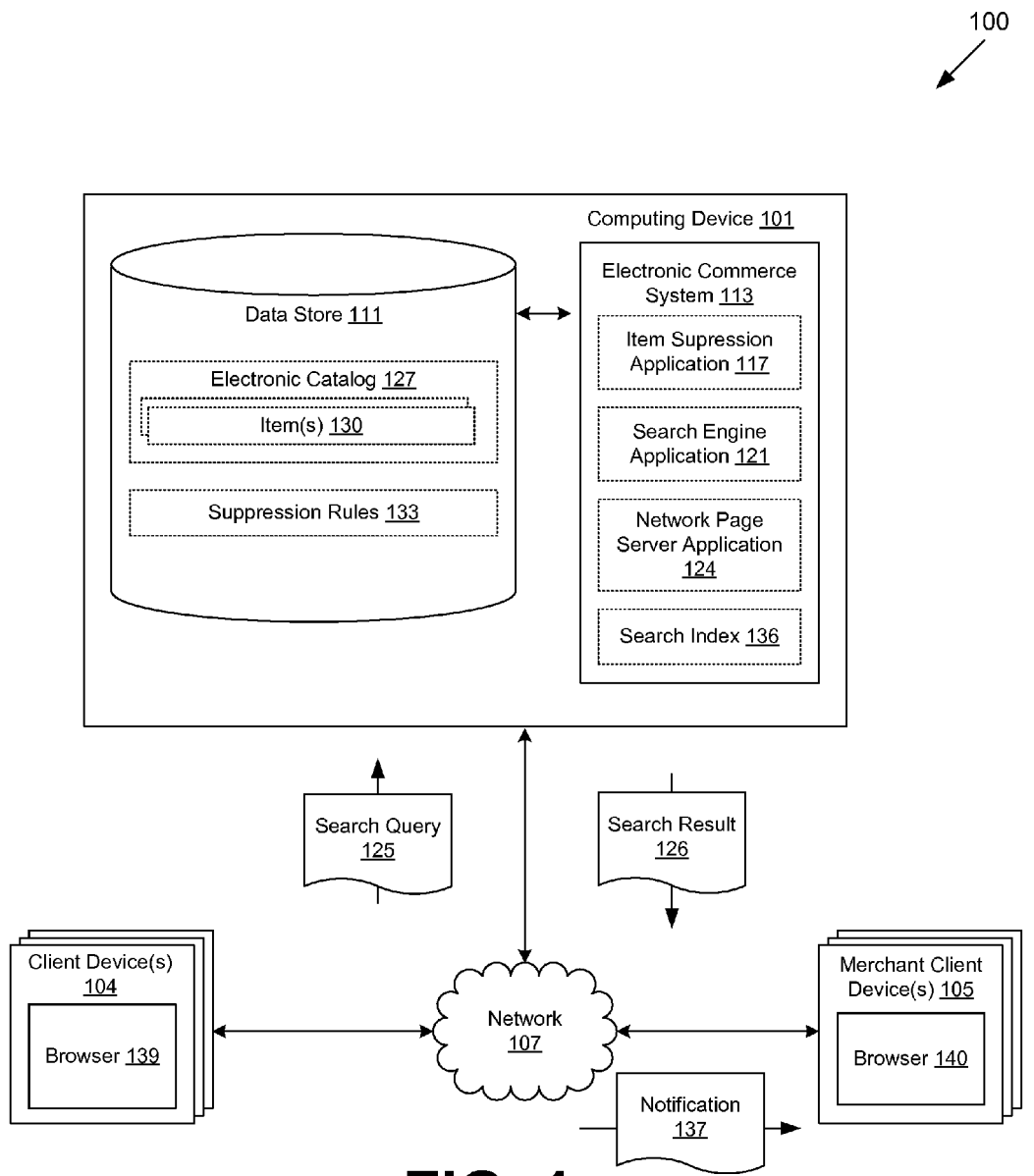
FIG. 1 is a drawing of a networked environment according to various embodiments of the present disclosure.

With reference to FIG. 1, shown is a networked environment 100 according to various embodiments. The networked environment 100 includes a computing device 101, a client device 104, and a merchant client device 105 connected by a network 107. The network 107 includes, for example, the Internet, intranets, extranets, wide area networks (WANs), local area networks (LANs), wired networks, wireless networks, or other suitable networks, etc., or any combination of two or more such networks.

The computing device 101 may comprise, for example, a server computer or any other system providing computing capability. Alternatively, a plurality of computing devices 101 may be employed that are arranged, for example, in one or more server banks or computer banks or other arrangements. For example, a plurality of computing devices 101 together may comprise a cloud computing resource, a grid computing resource, and/or any other distributed computing arrangement. Such computing devices 101 may be located in a single installation or may be distributed among many different geographical locations. For purposes of convenience, the computing device 101 is referred to herein in the singular. Even though the computing device is referred to in the singular, it is understood that a plurality of computing devices 101 may be employed in the various arrangements as described above.

Various applications and/or other functionality may be executed in the computing device 101 according to various embodiments. Also, various data is stored in a data store 111 that is accessible to the computing device 101. The data store 111 may be representative of a plurality of data stores as can be appreciated. The data stored in the data store 111, for example, is associated with the operation of the various applications and/or functional entities described below.

The components executed on the computing device 101, for example, include an electronic commerce system 113, and other applications, services, processes, systems, engines, or functionality not discussed in detail herein.

The electronic commerce system 113 is executed in order to facilitate the online purchase of items 130 over the network 125 The electronic commerce system 113 also performs various backend functions associated with the online presence of a merchant in order to facilitate the online purchase of items 130 as will be described. For example, the electronic commerce system 113 communicates with the network page server application 124 to generate network pages such as web pages or other types of network content that are provided to client devices 104 for the purposes of selecting items for purchase, rental, download, lease, or other form of consumption as will be described.

The electronic commerce system 113 may comprise subcomponents including a search engine application 114, an item suppression application 117, a network page server application 124, a search index 136, and other subcomponents. The search engine application 114 is executed to apply a search query 125 to the electronic catalog 127 and generate a search result 126 comprising items 130 responsive to the search query 125. A search index 136 comprises an index, data structure, or other data relating to the electronic catalog 127 which is accessed by the search engine application 114 in order to facilitate the search process. The search index 136 may also be stored in the data store 111, operate as a subcomponent of another entity.

The item suppression application 117 applies suppression rules 133 to items 130 stored within the electronic catalog 127. Items 130 which do not comply with suppression rules 133 are excluded from search results 126 generated by the search engine application 114. The network page server application 124 encodes network pages and communicates those network pages to the client device 104. In the alternative, content may be sent in a form other than via network pages (data to a local app).

The data stored in the data store 111 includes, for example, the electronic catalog 127, suppression rules 133, and potentially other data. The electronic catalog 127 comprises multiple electronic catalog entries corresponding to items 130 available for purchase through the electronic commerce system 113, and potentially other data. Suppression rules 133 define conditions for items 130 that, when met, result in the item 130 being suppressed from search results 126 generated by the search engine application 114.

The client device 104 is representative of a plurality of client devices that may be coupled to the network 107 The client device 104 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The client device 104 may be configured to execute various applications such as a browser 139 and/or other applications. The browser 139 may be executed in a client device 104 for example, to access and render network pages, such as web pages, or other network content served up by the computing device 101 and/or other servers. The client device 104 may be configured to execute applications beyond browser 139 such as, for example, email applications, instant message applications, and/or other applications.

The merchant client device 105 is representative of a plurality of client devices that may be coupled to the network 107 and used by merchants to interact with the electronic commerce system 113. The merchant client device 105 may comprise, for example, a processor-based system such as a computer system. Such a computer system may be embodied in the form of a desktop computer, a laptop computer, a personal digital assistant, a cellular telephone, set-top box, music players, web pads, tablet computer systems, game consoles, or other devices with like capability.

The merchant client device 105 may be configured to execute various applications such as a browser 140 and/or other applications. The browser 140 may be executed in a merchant client device 105 for example, to access and render network pages, such as web pages, or other network content served up by the computing device 101 and/or other servers. The merchant client device 105 may be configured to execute applications beyond browser 140 such as, for example, email applications, instant message applications, and/or other applications Next, a general description of the operation of the various components of the networked environment 100 is provided. To begin, item suppression application 117 selects at least one item 130 from the electronic catalog 127. The item 130 may be selected as a function of user input, by a process or service executed on the computing device 101, or by some other approach. Next, the item suppression application 117 selects at least one suppression rule 133 to apply to the selected item 130. Though the selected item 130 and selected suppression rule 133 will be referred to in the singular, it is understood that multiple items 130 and suppression rules 133 may be selected. The suppression rule 133 may be selected based on an item category or merchant associated with an item 130, or based on other associations or requirements. Suppression rules 133 may also be applicable to the entire corpus of items 130 stored within electronic catalog 127, a subset of the corpus of items 130, or some other classification of items 130.

Suppression rules 133 define conditions which, when met, indicate an item 130 should be suppressed from search results 126. In some embodiments, the suppression rule 133 may require some characteristic or attribute of the item 130 be disclosed. In other embodiments, the suppression rule 133 may define a threshold or range for a value, metric, statistic, or function calculated with respect to the item 130. Other conditions may be defined in suppression rule 133.

For example, in embodiments where the suppression rule 133 requires a characteristic or attribute of the item 130 to be disclosed, the suppression rule 133 may require that a wedding ring item 130 disclose the weight and color of the jewel in the wedding ring. As another example, where item 130 is a blue shirt, the suppression rule 133 may require that the item 130 disclose an image of the shirt. Other attributes or characteristics may also be used in suppression rules 133.

In embodiments where a suppression rule 133 considers a range or threshold for a value, the suppression rule 133 may define a maximum threshold for product returns associated with the item 130. In another example, where customers have the ability to file complaints about an item 130 with or without purchasing the item 130, the suppression rule 133 may define a maximum threshold for complaints associated with the item. As an additional example, the suppression rule 133 may define a minimum ratio of network page views associated with the item 133 compared to purchases of the item 133. Other values, metrics, functions, or statistics may be considered in a suppression rule 133.

Once the suppression rule 133 to be applied to the item 130 has been selected by the item suppression application 117, the item suppression application 117 applies the suppression rule 133 to the item 130. This is performed by determining if the item 130 meets the conditions for suppression defined in the suppression rule 133. In embodiments where the suppression rule 133 requires an item 130 to disclose an attribute, the item suppression application 117 determines if the item 130 contains the required information. In embodiments where the suppression rule 133 defines a maximum threshold amount for a value associated with the item 133, the item suppression application 117 determines the value by calculating the value, retrieving a stored pre-calculated value, or some other means, and determines if the value is below the threshold. Other methods or techniques of applying suppression rules 133 to an item 130 may be used.

If the item suppression application 117 determines that item 130 requires suppression, the item suppression application 117 excludes the item 130 from search results 126 responsive to a search query 125 input to the search engine application 114. In some embodiments, this comprises modifying or configuring a search index 136 associated with the electronic catalog 127. In other embodiments, this comprises modifying an attribute or flag associated with the item 130. For example, item 130 may be stored as a database entry with a column representing a suppressed status. In this example, the item suppression application 117 modifies the column of the database entry to indicate the item 130 has been suppressed. Other methods of excluding an item 130 may be accomplished. A suppressed item 130 may also be excluded from customer recommendations, email campaigns, promotions, and other listings of products communicated to a client device 104.

In some embodiments, the item suppression application 117 may communicate a notification 137 to a merchant client device 105 accessible to a merchant associated with the item 130 in response to a determination that the item 130 requires suppression. In some embodiments, the merchant is selected from a plurality of merchants based on predefined criteria. The notification 137 may also be communicated to other entities.

The contents of the notification 137 express to the merchant that the item 130 has been suppressed. The notification 137 may also express a reasoning as to why the item 130 has been suppressed. In other embodiments, the notification 137 may express a suggestion as to actions the merchant may take to prevent future suppression of the item 130. The notification 137 may also express other information.

Client device 104 may execute browser 139 to interact with an electronic commerce system 113. Other methods of interacting with the electronic commerce system 113 may also be used. Electronic commerce system 113 serves network pages to the client device 104 by interacting with a network page server application 124 and a search engine application 114. The client device 104 may submit search queries 125 to the search engine application 114 through a network page, or through other means. The search engine application 114 applies the search query 125 to the electronic catalog 127 to generate a search result 126. A suppressed item 130 will be excluded from the search results 126. The search results 126 are then encoded into one or more network pages served to the client device 104 by network page server application 124.

Figure 2A:
FIGS. 2A and 2B are drawings of examples of user interfaces rendered by a client in the networked environment of FIG. 1 according to various embodiments of the present disclosure.

Referring next to FIG. 2, shown is a non-limiting example user interface rendering network pages served by network page server application 124 (FIG. 1). FIG. 2A depicts a network page representing an item 130 (FIG. 1) stored in the electronic catalog 127 (FIG. 1). The item title 201 indicates the item 130 is a size 7 engagement ring. Item description 204 comprises many attributes relating to the setting and jewel of the ring. In this example, the jewel weight of the item 130 is unavailable. Placeholder 207 occupies the area where a picture of the ring would be rendered if available. In this example, a suppression rule 133 (FIG. 1) may be associated with an engagement ring item category which requires that a jewel weight be disclosed in the item 130. Also, a suppression rule 133 (FIG. 1) may be associated with a jewelry item category which requires an image be disclosed in the item 130. Item suppression application 117 (FIG. 1) would suppress this item 130 from search results 126 (FIG. 1).

Figure 2B:
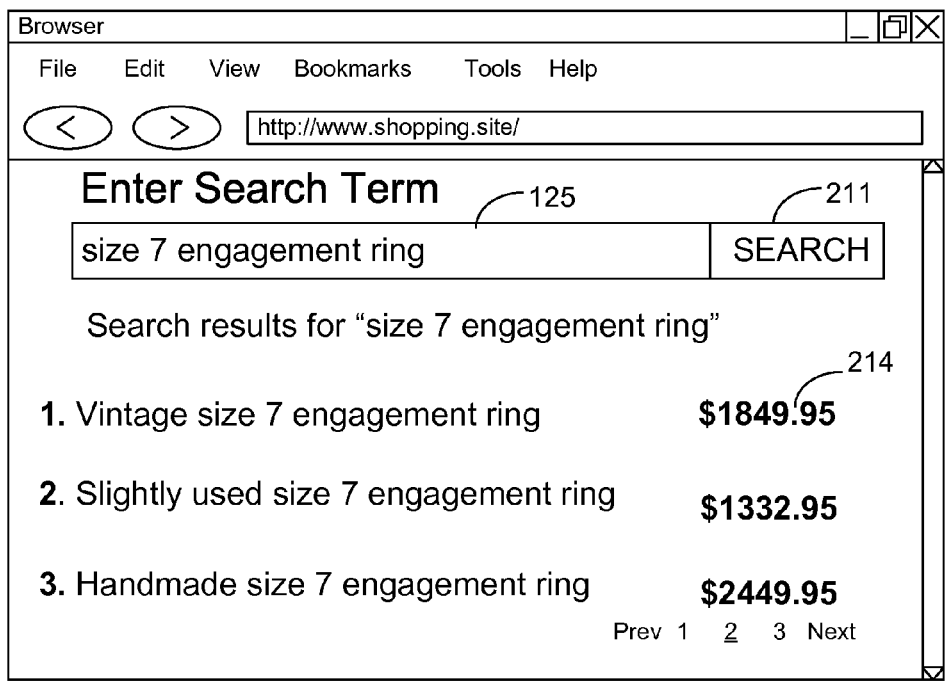

FIG. 2B depicts a network page soliciting input for a search query 125 (FIG. 1). When a submit button 211 is pressed, the search query 125 is input to the search engine application 114 (FIG. 1), generating search results 126 (FIG. 1). Search results 126 are then encoded into a network page as a search result list 214. It is noted that in this example the search query 125 is a substring of the item title 201 shown in FIG. 2A. The item 130 of FIG. 2A is not present in the search result list 214 despite the similarities between the search query 125 and the item title 211 due to the item 130 having been suppressed.

Figure 3:
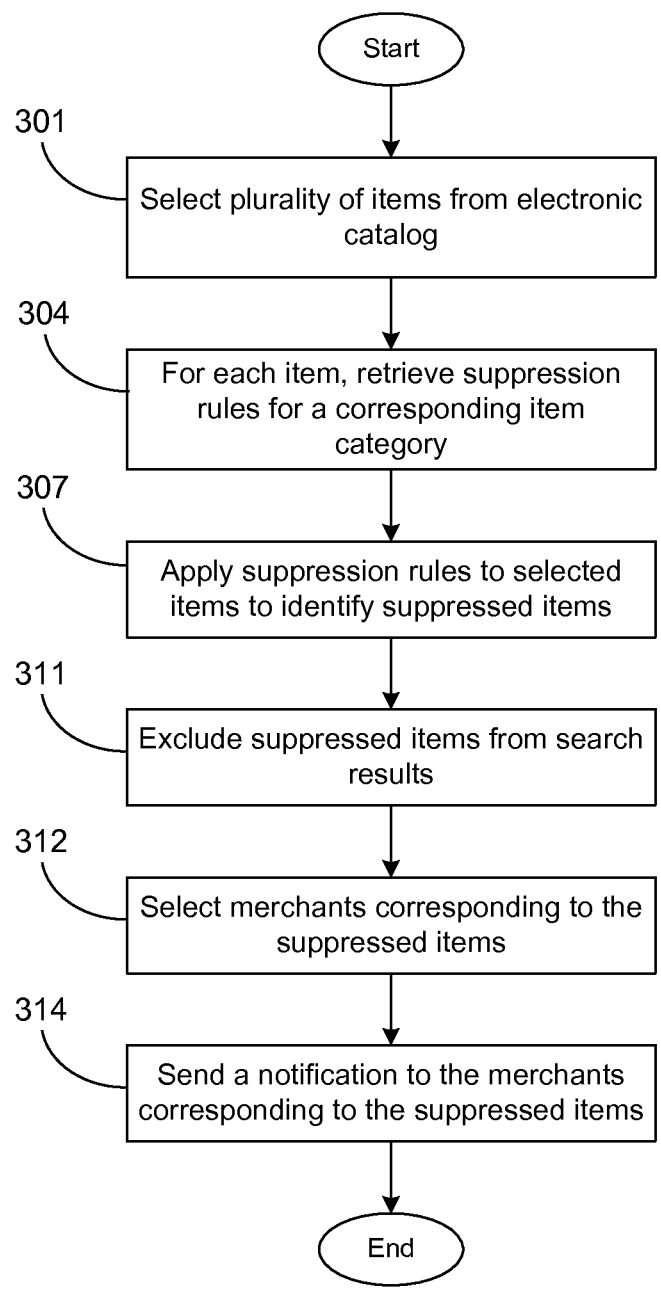
FIG. 3 is a flowchart illustrating one example of functionality implemented as portions of an item suppression application executed in a computing device in the networked environment of FIG. 1 according to various embodiments of the present disclosure.

Turning now to FIG. 3, shown is a flowchart that provides one example of the operation of a portion of the item suppression application 117 (FIG. 1) according to various embodiments. It is understood that the flowchart of FIG. 3 provides merely an example of the many different types of functional arrangements that may be employed to implement the operation of the portion of the item suppression application 117 as described herein. As an alternative, the flowchart of FIG. 3 may be viewed as depicting an example of steps of a method implemented in the computing device 101 (FIG. 1) according to one or more embodiments.

Beginning with box 301, a plurality of items 130 (FIG. 1) is selected from an electronic catalog 127 (FIG. 1). In some embodiments, this is accomplished as a function of user input. In other embodiments, this is accomplished by iterating through the entirety or a subset of the corpus of the electronic catalog 127. In further embodiments, the plurality of items 130 is selected as a function of predefined criteria or based on a category designation. The plurality of items 130 may also be selected randomly. Other approaches may be used to select the plurality of items 130.

In box 304, the item suppression application 117 selects a plurality of suppression rules 133 (FIG. 1) to apply to each item 130 in the plurality of items 130. In this example embodiment, the suppression rules 133 (FIG. 1) are selected for each item 130 based on an item category associated with the item 130. For example, if an item 130 is a shirt, the item suppression application 117 selects suppression rules 133 for the "clothing" item category. Other methods may be used to select the suppression rules 133.

In box 307, the item suppression application 117 identifies items 130 to be suppressed by applying the suppression rules 133 to the plurality of items 130. In some embodiments, this involves determining if an attribute or characteristic is defined in the items 130. For example, if a suppression rule 133 for the jewelry item category requiring jewel weight is applied to an engagement ring item 130, the item suppression application determines if the engagement ring item 130 discloses the required jewel weight. In other embodiments, this involves determining if an image is associated with the item 130. In further embodiments, applying the suppression rules 133 involves retrieving or calculating a value associated with the item 130 and determining if it exceeds a maximum threshold. For example, if a suppression rule 133 for the electronics item category defines a maximum allowable product return rate of 10% and is applied to a DVD player item 130, the item suppression application retrieves or calculates the product return rate for the DVD player item 130 to determine if it exceeds the 10% threshold. Other methods of applying suppression rules 133 may also be used.

In box 311, the identified items 130 to be suppressed are excluded from search results 126 (FIG. 1) generated by the search engine application 114 (FIG. 1). In some embodiments, this is accomplished by modifying or configuring a search index 136 (FIG. 1) associated with the electronic catalog 127 which is accessed by the search engine application 114. In other embodiments, this is accomplished by modifying an attribute associated with the item 130. For example, a database entry corresponding to the item 130 may have an attribute indicating whether the item 130 is suppressed. The item suppression application 117 may modify the attribute value to indicate the item 130 is suppressed. Other methods of excluding the item 130 from search results 126 may also be used.

In box 312, merchants 105 corresponding to the suppressed items 130 are selected. These merchants 105 are selected based on a predefined selection criterion. For example, certain merchants 105 may have permissions necessary to edit an electronic catalog 127 entry corresponding to the item 130 to supply missing information. Other criteria may also be used to select the merchants 105.

In box 314, a notification 137 is communicated to a merchant associated with each suppressed item 130. In some embodiments, this is accomplished by sending an email message to the merchant. In other embodiments, this is accomplished by inserting a message into a network page served to the merchant client device 105. For example, when the merchant client device 105 accesses a network page storefront associated with the electronic commerce system 113 (FIG. 1), the network page server application 124 (FIG. 1) serves the storefront network page with a message inserted into the content. Other approaches and communications media may also be used to communicate the notification to the merchant.

Figure 4:
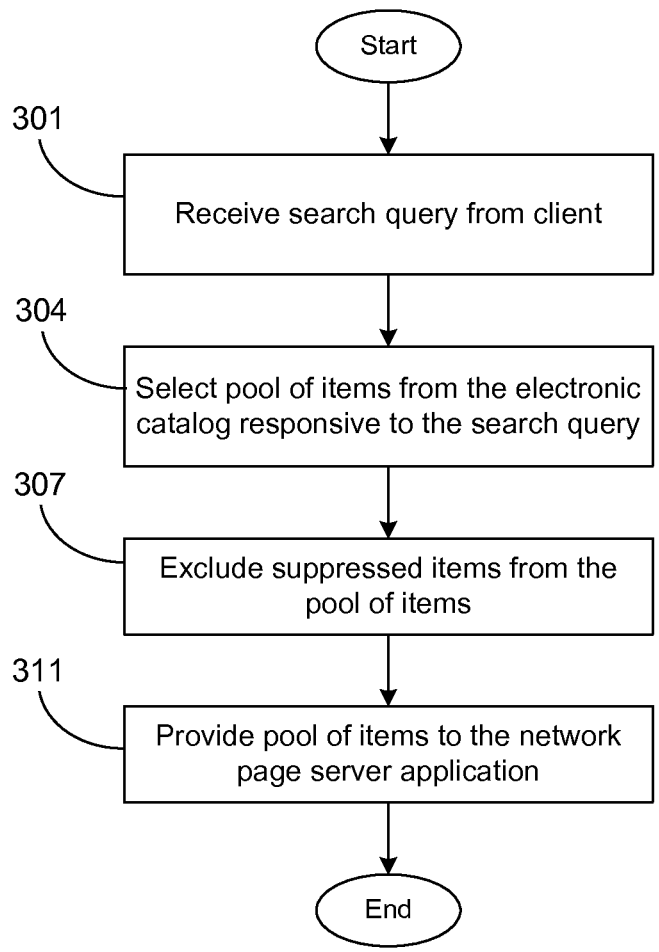
FIG. 4 is a flowchart illustrating one example of functionality implemented as portions of a search engine application executed in a computing device in the networked environment of FIG. 1 according to various embodiments of the present disclosure.

Moving on to FIG. 4, shown is a flowchart that provides one example of the operation of a portion of the search engine application 114 (FIG. 1) according to various embodiments. It is understood that the flowchart of FIG. 4 provides merely an example of the many different types of functional arrangements that may be employed to implement the operation of the portion of the search engine application 114 as described herein. As an alternative, the flowchart of FIG. 4 may be viewed as depicting an example of steps of a method implemented in the computing device 101 (FIG. 1) according to one or more embodiments.

Beginning with box 401, the search engine application 114 receives a search query 125 (FIG. 1). This may have been communicated to the search engine application 114 from a network page served by the network page server application 124 (FIG. 1). The search engine application 114 may receive a search query 125 in some other way.

In box 404, the search engine application 114 selects a pool of items 130 (FIG. 1) from the electronic catalog 127 (FIG. 1) responsive to the search query 125. This may be accomplished by executing a function on the search query 125 and the corpus of items 130. This may also be accomplished by executing a function on the search query 125 and a search index 136 (FIG. 1) associated with the electronic catalog 127. Other methods of selecting a pool of items 130 using the search query 125 may also be used.

In box 407, suppressed items 130 are excluded from the pool of items 130. In some embodiments, this occurs concurrently with the selection of the pool of items 130. For example, the function which selects the pool of items 130 may use a conditional restriction to only select unsuppressed items 130. As another example, the plurality of items 130 may be selected using a search index 136 which has been modified to exclude the suppressed items 130. In other embodiments, the suppressed items 130 are removed from the pool of items 130 subsequent to selecting the pool of items 130. For example, the search engine application 114 may analyze the pool of items 130 and remove suppressed items 130. Other approaches of excluding suppressed items 130 may also be used.

In box 411, the pool of items 130 are provided to the network page server application 124 as search results 126. The network page server application 124 may then encode the search results 126 into a network page to be served.

Figure 5:
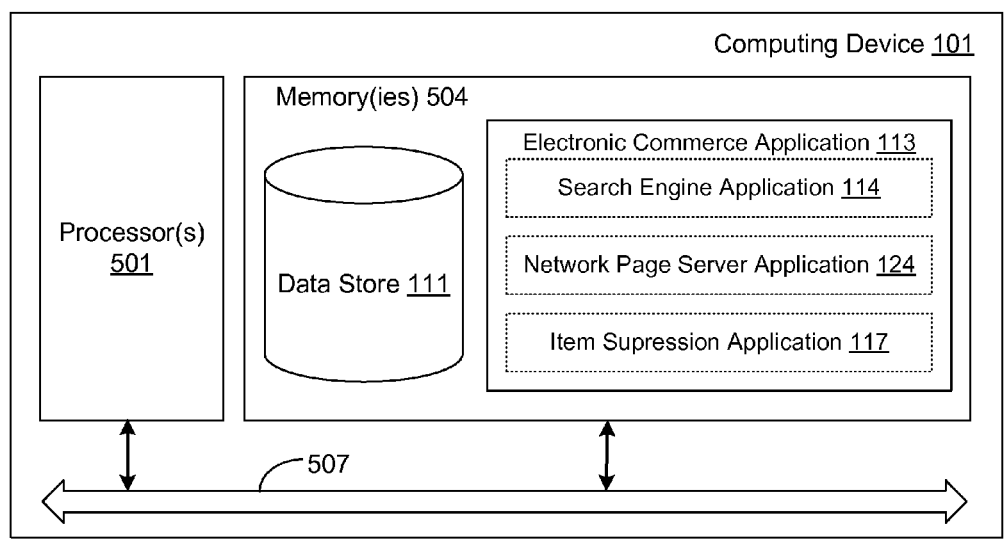
FIG. 5 is a schematic block diagram that provides one example illustration of a computing device employed in the networked environment of FIG. 1 according to various embodiments of the present disclosure.

With reference to FIG. 5, shown is a schematic block diagram of the computing device 101 (FIG. 1) according to an embodiment of the present disclosure. The computing device 101 includes at least one processor circuit, for example, having a processor 501 and a memory 504, both of which are coupled to a local interface 507. To this end, the computing device 101 may comprise, for example, at least one server computer or like device. The local interface 507 may comprise, for example, a data bus with an accompanying address/control bus or other bus structure as can be appreciated.

Stored in the memory 504 are both data and several components that are executable by the processor 501. In particular, stored in the memory 504 and executable by the processor 501 are a search engine application 114 (FIG. 1) an item suppression application 117 (FIG. 1), an electronic commerce system 113 (FIG. 1), a network page server application 124 (FIG. 1), and potentially other applications. Also stored in the memory 504 may be a data store 111 and other data. In addition, an operating system may be stored in the memory 504 and executable by the processor 501.

It is understood that there may be other applications that are stored in the memory 504 and are executable by the processors 501 as can be appreciated. Where any component discussed herein is implemented in the form of software, any one of a number of programming languages may be employed such as, for example, C, C++, C#, Objective C, Java, Javascript, Perl, PHP, Visual Basic, Python, Ruby, Delphi, Flash, or other programming languages.

A number of software components are stored in the memory 504 and are executable by the processor 501. In this respect, the term "executable" means a program file that is in a form that can ultimately be run by the processor 501. Examples of executable programs may be, for example, a compiled program that can be translated into machine code in a format that can be loaded into a random access portion of the memory 504 and run by the processor 501, source code that may be expressed in proper format such as object code that is capable of being loaded into a random access portion of the memory 504 and executed by the processor 501, or source code that may be interpreted by another executable program to generate instructions in a random access portion of the memory 504 to be executed by the processor 501, etc. An executable program may be stored in any portion or component of the memory 504 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 504 is defined herein as including both volatile and nonvolatile memory and data storage components. Volatile components are those that do not retain data values upon loss of power. Nonvolatile components are those that retain data upon a loss of power. Thus, the memory 504 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 501 may represent multiple processors 501 and the memory 504 may represent multiple memories 504 that operate in parallel processing circuits, respectively. In such a case, the local interface 507 may be an appropriate network 107 (FIG. 1) that facilitates communication between any two of the multiple processors 501, between any processor 501 and any of the memories 504, or between any two of the memories 504, etc. The local interface 507 may comprise additional systems designed to coordinate this communication, including, for example, performing load balancing. The processor 501 may be of electrical or of some other available construction.

Although an item suppression application 117, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The flowcharts of FIGS. 3 and 4 show the functionality and operation of an implementation of portions of the item suppression application 117 or search engine application 114, respectively. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 501 in a computer system or other system. The machine code may be converted from the source code, etc. If embodied in hardware, each block may represent a circuit or a number of interconnected circuits to implement the specified logical function(s).

Although the flowcharts of FIGS. 2 and 3 show a specific order of execution, it is understood that the order of execution may differ from that which is depicted. For example, the order of execution of two or more blocks may be scrambled relative to the order shown. Also, two or more blocks shown in succession in FIGS. 2 and 3 may be executed concurrently or with partial concurrence. Further, in some embodiments, one or more of the blocks shown in FIGS. 2 and 3 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including an item suppression application, that comprises software or code can be embodied in any non-transitory computer-readable medium for use by or in connection with an instruction execution system such as, for example, a processor 501 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method comprising:
   selecting, by at least one computing device, an electronic catalog entry from an electronic catalog;
   selecting, by the at least one computing device, a plurality of suppression rules based at least in part on a product category associated with the electronic catalog entry or a merchant associated with the electronic catalog entry;
   applying, by the at least one computing device, the plurality of suppression rules to the electronic catalog entry;
   determining, by the at least one computing device, that the electronic catalog entry is a suppressed entry by applying the plurality of suppression rules to the electronic catalog entry;
   setting, by the at least one computing device, a flag of a database entry corresponding to the electronic catalog entry to indicate that the electronic catalog entry is a suppressed entry and is not eligible to be listed in a search index for a search engine;
   in response to the electronic catalog entry being a suppressed entry, excluding, by the at least one computing device, the electronic catalog entry from the search index for the search engine;
   wherein the plurality of suppression rules comprise at least one of: a number of product returns corresponding to the electronic catalog entry meeting a predefined threshold, a number of customer complaints corresponding to the electronic catalog entry meeting a predefined threshold, the electronic catalog entry lacking disclosure of a required product information, or the electronic catalog entry lacking a corresponding image,
   wherein different suppression rules specify different requirements for electronic catalog entries based on the product category associated with a respective electronic catalog entry or the merchant associated with the respective electronic catalog entry;

storing the search index as a data structure in a data store; and generating, by the search engine accessing the search index, a list of search results, wherein the list of search results does not include at least the suppressed entry irrespective of a search query that initiated the search by the search engine.

2. The method of claim 1, wherein the plurality of suppression rules further define a maximum threshold of a metric associated with the electronic catalog entry.

3. The method of claim 1, wherein the plurality of suppression rules further define a maximum threshold of customer complaints associated with the electronic catalog entry.

4. The method of claim 1, further comprising communicating, by the at least one computing device, a notification to the merchant associated with the electronic catalog entry indicating that the electronic catalog entry is suppressed.

5. A system, comprising:

at least one computing device, configured to at least:

select a catalog entry corresponding to an item from an electronic catalog;

select a plurality of suppression rules based at least in part on an item category associated with the item or a merchant associated with the item;

apply the plurality of suppression rules to the catalog entry for the item;

determine that the catalog entry corresponding to the item is to be suppressed by applying the plurality of suppression rules to the catalog entry for the item; and exclude, in response to a determination that the catalog entry for the item is to be suppressed, the item from a search index for a search engine;

wherein the plurality of suppression rules comprise at least one of: a number of product returns corresponding to the item meeting a predefined threshold, a number of customer complaints corresponding to the item meeting a predefined threshold, an electronic catalog entry associated with the item lacking a required product information, the electronic catalog entry associated with the item lacking a corresponding image, or a ratio of page views to item purchases associated with the item meeting another predefined threshold;

store the search index as a data structure in a data store; and generate a list of search results, by the search engine accessing the search index, wherein the list of search results does not include the catalog entry irrespective of a search query that initiated the search by the search engine.

6. The system of claim 5, wherein the at least one computing device is further configured to communicate, in response to the determination that the catalog entry for the item is to be suppressed, a notification message to the merchant associated with the item indicating that the catalog entry for the item has been suppressed.

7. The system of claim 6, wherein communicating the notification message to the merchant further comprises generating an email for communication to the merchant.

8. The system of claim 6, wherein communicating the notification message to the merchant further comprises inserting the notification message into a network page communicated to the merchant.

9. The system of claim 6, wherein the notification message comprises a suggestion to remedy a suppression of the catalog entry for the item.

10. The system of claim 5, wherein excluding the catalog entry for the item from the search index comprises modifying a previous version of the search index associated with the electronic catalog.

11. The system of claim 6, wherein excluding the item from the search index further comprises modifying an attribute of the electronic catalog entry associated with the item.

12. The system of claim 5, wherein the at least one computing device is further configured to exclude, in response to the determination that the catalog entry for the item is to be suppressed, the item from a listing of items communicated to a client.

13. The system of claim 12, wherein the listing of items comprises at least one of an item recommendation or a promotion.

14. A method, comprising:

selecting, in a computing device, a catalog entry from an electronic catalog;

selecting, in the computing device, a plurality of suppression rules based at least in part on a product category associated with the catalog entry or a merchant associated with the catalog entry;

determining, in the computing device, that the catalog entry meets a predefined suppression condition by applying the plurality of suppression rules to the catalog entry;

configuring, in the computing device, in response to the catalog entry meeting the predefined suppression condition, the electronic catalog to exclude the catalog entry from a search index for a search engine;

wherein the predefined suppression condition comprises at least one of: a number of product returns corresponding to the catalog entry meeting a predefined threshold, a number of customer complaints corresponding to the catalog entry meeting a predefined threshold, the catalog entry associated with the catalog entry lacking a required product information, the catalog entry lacking a corresponding image, or a ratio of page views to item purchases associated with the catalog entry meeting another predefined threshold;

storing the search index as a data structure in a data store; and generating, in the computing device, a list of search results by the search engine accessing the search index, wherein the list of search results does not include the catalog entry irrespective of a search query that initiated the search by the search engine.

15. The method of claim 14, wherein the electronic catalog further comprises the search index, and configuring the electronic catalog to exclude the catalog entry from the search index comprises modifying a previous version of the search index.

16. The method of claim 15, wherein configuring the electronic catalog to exclude the catalog entry from the search index further comprises flagging the catalog entry.

17. The method of claim 14, further comprising communicating, in the computing device, a notification to the merchant associated with the catalog entry in response to the catalog entry meeting the predefined suppression condition.

18. The method of claim 14, further comprising excluding, by the computing device, the catalog entry from a listing communicated to a client.

19. The method of claim 18, wherein the listing comprises an item recommendation.

20. The method of claim 18, wherein the listing comprises a campaign.

\* \* \* \* \*